No. 870,526. PATENTED NOV. 5, 1907.
A. T. BOSSERT.
REGULATING VALVE FOR LIGHTING TANKS.
APPLICATION FILED MAY 31, 1907.
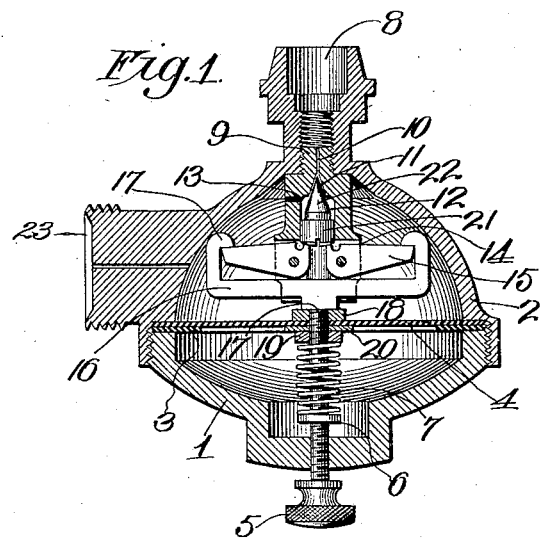
Witnesses
Frank P. Glore
H. C. Rodgers
Inventor
A. T. Bossert.
By George J. Thorpe Atty.

UNITED STATES PATENT OFFICE.

ALBERT T. BOSSERT, OF KANSAS CITY, MISSOURI, ASSIGNOR OF ONE-HALF TO WILLIAM B. DODDRIDGE, OF KANSAS CITY, MISSOURI.

REGULATING-VALVE FOR LIGHTING-TANKS.

No. 870,526.     Specification of Letters Patent.     Patented Nov. 5, 1907.

Application filed May 31, 1907. Serial No. 376,460.

*To all whom it may concern:*

Be it known that I, ALBERT T. BOSSERT, a citizen of the United States, residing at Kansas City, in the county of Jackson and State of Missouri, have invented certain new and useful Improvements in Regulating-Valves for Lighting-Tanks, of which the following is a specification.

This invention relates to regulating valves for gas lighting tanks, and my object is to produce a valve of this character whereby the high pressure of acetylene or other gas in a storage tank shall be converted into and maintained at a low uniform pressure on one or more lamps in a lighting system, for an automobile, railway car, house, or any other purpose.

With these general objects in view and others as hereinafter appear, the invention consists in certain novel and peculiar features of construction and organization as hereinafter described and claimed; and in order that it may be fully understood reference is to be had to the accompanying drawing, in which—

Figure 1, is a central vertical section of a valve embodying my invention. Fig. 2, is an inverted plan view of the cap member of the valve casing and valve therein. Fig. 3, is an enlarged plan view of the valve and controlling levers therefor. Fig. 4, is a side view of the structure shown by Fig. 3.

In the said drawing, 1 indicates the lower or cup-shaped member and 2 the cap or dome member of a valve casing, said members being adapted to screw together with a rubber gasket 3 and leather or other flexible diaphragm 4, between them.

5 is a set screw seated centrally in the lower member and provided with a collar or shoulder 6 on which is seated an expansion coil spring 7 fitting around and projecting beyond the upper end of the screw.

8 is a tubular neck forming a central upward extension of the cap-member and adapted for connection with a high pressure gas tank, not shown, and 9 a plug having its upper end of reduced diameter and screwed into the neck passage. Said plug is provided with a passage consisting of the upper contracted portion 10, the downwardly flared or valve-seat portion 11 and the enlarged cylindrical portion 12, and connecting the latter with the interior of the cap-member is a radial gas passage 13. The lower end of the plug is diametrically enlarged and bifurcated as at 14 and pivoted in said bifurcation are levers 15. 16 is an inverted yoke also fitting in said bifurcation and terminating in hooks overlapping the outer ends of the said levers and provided with a central depending threaded stem 17 in alinement with the set-screw and extending centrally through the diaphragm and into the upper end of the coil spring, a pair of nuts 18 and 19 being mounted on the stem above and below the diaphragm with a washer 20 clamped between the nut 19 and the diaphragm and the latter between said washer and nut 18 so that movement of the diaphragm shall impart movement to the yoke.

21 indicates a valve fitting in enlargement 12 of the tubular plug passages and provided with an upwardly tapering end or point 22 to engage the valve-seat at times and close communication between the gas tank and passage 13, said valve by gravity and the pressure from said tank being normally depressed to establish such communication, the pressure on the cap being reduced in the required degree because the diaphragm is expanded or bulged downward and through the inverted yoke exerts a downward pull on the outer ends of the levers and through the latter an upward pressure on the valve. It will be noticed in this connection that by the construction described, viz. the large area of the diaphragm, so that it will move under light pressure in the cap member—and the long leverage of the yoke on the valve—through levers 15—the leverage of the light pressure in the cap is compounded to counteract and under certain conditions overcome the high pressure of the tank. The pressure maintained in the cap-member and hence on the lamps may be varied by increasing or diminishing the tension of spring 7 by proper adjustment of the set screw.

The gas at the pressure to which it is reduced passes off through the laterally projecting tubular arm 23, to pipes (not shown) connected to the lamps or equivalent devices, it being obvious that the pressure in the cap-member remains the same irrespective of the number of lamps in use because an increase or decrease in the consumption is instantly accommodated by the admission of a greater or less volume of gas into the cap.

In lighting systems—such as on automobiles—when the pressure tank and lamp are some distance apart, the operator must first turn on his gas and then light his lamps. If the supply of gas is insufficient to produce the desired light he must open the valve further—if excessive the lighting of the lamps usually results in the destruction of the lamp reflector or front glasses accordingly as the lamp opens at the front or rear. Again if the burner of one lamp becomes stopped up the remaining lamp is endangered by the flaring up of the flame caused by the increased pressure imposed thereon. When the tank is at low pressure and the lights get dim, the operator must get out and open the valve wider. With my equalizing valve all of these troubles are eliminated and if the lamps are equipped with cut-off valves it is not necessary to touch the equalizing valve after once adjusting the screw 5 to obtain the desired height of flame in the lamps, the screw being advanced to increase the pressure on the lamps by increasing the resistance offered by the diaphragm and withdrawn to obtain the opposite effect. Ordinarily about a three ounce pressure on the lamps gives a sufficient flame to produce the illumination desired.

From the above description it will be apparent that I have produced a regulator valve which embodies the features enumerated as desirable in the statement of invention and I wish it to be understood that I do not desire to be restricted to the exact details of construction shown and described as obvious modifications will suggest themselves to one skilled in the art.

Having thus described the invention what I claim as new and desire to secure by Letters Patent is:—

1. The combination of a casing having inlet and outlet openings, a diaphragm therein, a plug within the casing above the diaphragm having openings communicating with the inlet and outlet openings of the casing, a valve within the plug arranged to close the inlet opening, levers having their inner ends bearing against the bottom of the valve, and a yoke carried by the diaphragm and having its ends extended up beyond and turned over to rest upon the outer ends of the levers.

2. The combination of a casing having inlet and outlet passages, a diaphragm therein, a plug within the casing above the diaphragm having openings communicating with the inlet and outlet passages of the casing, the lower end of the plug being bifurcated, a valve within the plug arranged to close the inlet opening, levers pivoted within the bifurcation at the lower end of the plug and having their inner ends bearing against the bottom of the valve, and a yoke carried by the diaphragm and playing in said bifurcation and having its ends projecting upward beyond the outer ends of the levers and turned over to rest upon the same.

In testimony whereof I affix my signature, in the presence of two witnesses.

ALBERT T. BOSSERT.

Witnesses:
H. C. RODGERS,
W. B. DODDRIDGE.